(12) United States Patent
Crews et al.

(10) Patent No.: US 11,998,090 B1
(45) Date of Patent: Jun. 4, 2024

(54) WATCH BAND WITH MARKERS (71) Applicant: Apple Inc., Cupertino, CA (US)

(72) Inventors: Kathryn P. Crews, Menlo Park, CA (US); Peter F. Coxeter, Erie, CO (US); Yiwei Tao, Campbell, CA (US); Shantanu R Ranade, San Jose, CA (US); Christopher I. Edwards, Odenton, MD (US); David M. Kindlon, Felton, CA (US); Linda D. Benavente-Notaro, Menlo Park, CA (US)

(73) Assignee: Apple Inc., Cupertino, CA (US)

(*) Notice: Subject to any disclaimer, the term of this patent is extended or adjusted under 35 U.S.C. 154(b) by 294 days.

(21) Appl. No.: 17/554,350

(22) Filed: Dec. 17, 2021

Related U.S. Application Data (60) Provisional application No. 63/127,945, filed on Dec. 18, 2020.

(51) Int. Cl.
G06F 3/01 (2006.01)
A44C 5/00 (2006.01)
G06K 19/06 (2006.01)

(52) U.S. Cl.
CPC ............ *A44C 5/0053* (2013.01); *G06F 3/011* (2013.01); *G06K 19/0614* (2013.01)

(58) Field of Classification Search
CPC .... A44C 5/0053; G06F 3/011; G06K 19/0614
See application file for complete search history.

(56) References Cited

U.S. PATENT DOCUMENTS

| 2010/0013812 | A1* | 1/2010 | Gu | G06F 3/014 345/207 |
| 2015/0258431 | A1* | 9/2015 | Stafford | G06F 3/014 463/31 |
| 2020/0326902 | A1* | 10/2020 | Eronen | G06F 3/165 |

\* cited by examiner

*Primary Examiner* — Kiho Kim
(74) *Attorney, Agent, or Firm* — BAKERHOSTETLER (57) ABSTRACT Systems of the present disclosure can provide a watch band that provide a marker pattern to a computer-generated reality device. The watch band can include structures or features that provide an identifiable marker pattern to the computer-generated reality device. The structures or features that provide the marker pattern can be invisible or imperceptible to the user. Structures or features of the watch band can include infrared reflective thread, visually obscured markers, or lenticular lens assemblies.

20 Claims, 4 Drawing Sheets

WATCH BAND WITH MARKERS

CROSS-REFERENCE TO RELATED APPLICATION

This application claims the benefit of U.S. Provisional Application No. 63/127,945, filed Dec. 18, 2020, the entirety of which is incorporated herein by reference.

TECHNICAL FIELD

The present description relates generally to markers for computer-generated reality, and, more particularly, to watch bands or other wearable devices that include markers for computer-generated reality.

BACKGROUND

Devices can provide a mixed reality (MR) environment in which a simulated environment is designed to incorporate sensory inputs from the physical environment, or a representation thereof, in addition to including computer-generated sensory inputs (e.g., virtual objects). In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof).

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Electronic systems may utilize identifiable markers to track the location and/or orientation of a reference point from the physical environment. For example, electronic systems may track the location and/or orientation of the user's hands to allow information regarding the positioning of the user's hands to be incorporated into a virtual reality (VR) system, an augmented reality (AR) system, and/or a mixed reality (MR) system.

In some applications, electronic systems may visually track distinct markers to provide a reference from the physical environment or surroundings of the user. Markers are often visually distinctive and unwieldy. Therefore, markers for electronic systems may not be convenient or visually appealing to users.

It can be desirable to provide markers that are visually appealing and convenient for users while providing a reliable reference point for electronic systems. For example, systems of the present disclosure can provide a watch band that provide a marker pattern to a computer-generated reality device. The watch band can include structures or features that provide an identifiable marker pattern to the computer-generated reality device. The structures or features that provide the marker pattern can be invisible or imperceptible to the user. Structures or features of the watch band can include infrared reflective thread, visually obscured markers, or lenticular lens assemblies.

These and other embodiments are discussed below with reference to FIGS. 1-6. However, those skilled in the art will readily appreciate that the detailed description given herein with respect to these Figures is for explanatory purposes only and should not be construed as limiting.

Figure 1:
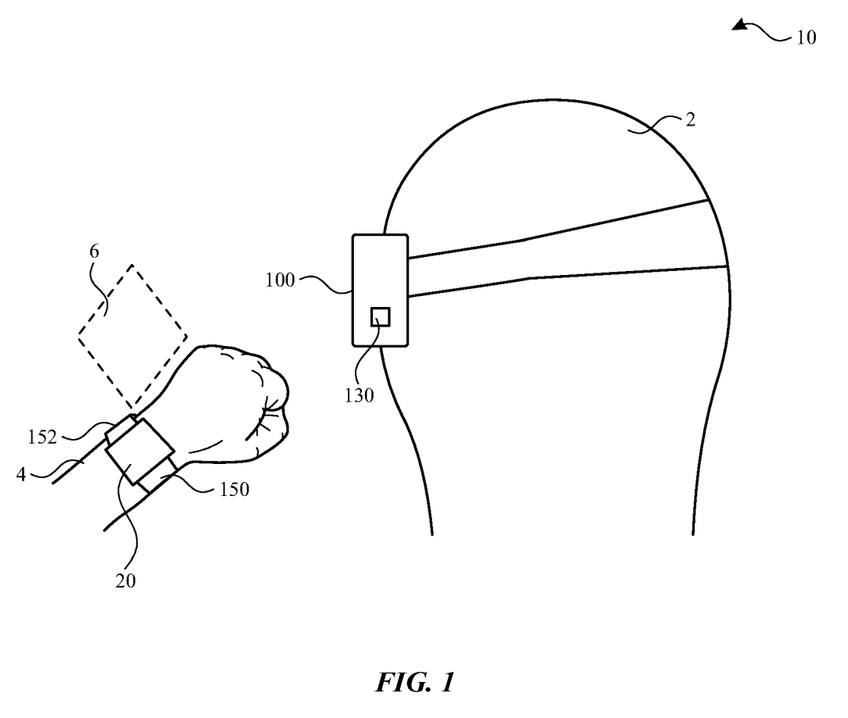
FIG. 1 illustrates a computer-generated reality system, according to some embodiments of the present disclosure.

With reference to FIG. 1, an electronic system 10 can be used, held, or worn by a user to display visual information to the user. The electronic system 10 can be used as a computer-generated reality (CGR) system, a virtual reality (VR) system, an augmented reality (AR) system, and/or a mixed reality (MR) system. For example, the electronic system 10 can include a head-mountable device 100 to display visual information to the user. As can be appreciated, other devices, such as a mobile phone, a tablet computing device, or other computing device can be used as to display information to the user and as a computer-generated reality (CGR) system, a virtual reality (VR) system, an augmented reality (AR) system, and/or a mixed reality (MR) system.

A user 2 may observe outputs provided by the head-mountable device 100, such as visual information provided on a display. The display can optionally allow a user 2 to observe and interact with an environment outside of the head-mountable device 100. Other outputs provided by the head-mountable device 100 can include speaker output and/or haptic feedback. A user 2 may further interact with the head-mountable device 100 by providing inputs for processing by one or more components of the head-mountable device 100. For example, the user 2 can provide tactile inputs, voice commands, and other inputs while the device is mounted to the user's head.

The head-mountable device 100 can include and/or support one or more camera modules 130. The camera modules 130 can be positioned to capture images of views external to the head-mountable device 100. The captured images can be used for display to the user or stored for any other purpose.

The head-mountable device 100 can include display elements that provide visual output for viewing by a user wearing the head-mountable device 100. A display element can transmit light from a physical environment (e.g., as captured by a camera module) for viewing by the user. Additionally or alternatively, a display element can provide information as a display within a field of view of the user. Such information can be provided to the exclusion of a view of a physical environment or in addition to (e.g., overlaid with) a physical environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In the depicted example, one or more fiducial markers, interest points, or generally, markers 152 to provide a reference from the physical environment to the electronic system 10. For example, the marker 152 can provide the position and/or orientation of the user's arm 4 relative to the head-mountable device 100.

During operation, cameras 130 of the head-mountable device 100 can visually identify and track the position and/or orientation of the marker 152. The markers 152 can be machine-identifiable, such that the markers 152 can be detected by feature detection methods such as corner detection, blob detection, edge detection or thresholding, and other image processing methods. Detected data regarding the marker 152 can be utilized to establish the position and/or orientation of the marker 152. In some applications, the geometry of the marker 152 is known or previously established to calculate the position and/or orientation of the marker 152.

In the depicted example, the marker 152 can be integrated with a wearable component that is worn by the user 2. For example, the marker 152 can be integrated into the watch band 150 of a watch 20. Advantageously, by integrating the marker 152 with the watch band 150, the marker 152 can be readily available to provide a reference point during the use of the electronic system 10 without requiring additional equipment.

As can be appreciated, the marker 152 can allow for various functions. For example, the marker 152 can provide a reference point in the physical environment to virtually overlay an interface 6 using the displays of the head-mountable device 100 or other suitable device. The user 2 can use the interface 6 to launch applications or interact with applications within the electronic system 10.

In some embodiments, the marker 152 can include information that allows for the calibration of the electronic system 10 relative to its environment, including spatial calibration of sensors of the electronic system 10 and/or color calibration of displays of the electronic system 10.

In some applications, the markers 152 can be uniquely identifiable. Optionally, the marker 152 can be linked to the user 2 to allow the user to be identified by the electronic system 10 via the marker 152. In some embodiments, other electronic systems, such as devices of other individuals can identify the user 2 via the marker 152. The marker 152 can store or link information the user 2 wishes to share.

Figure 2:
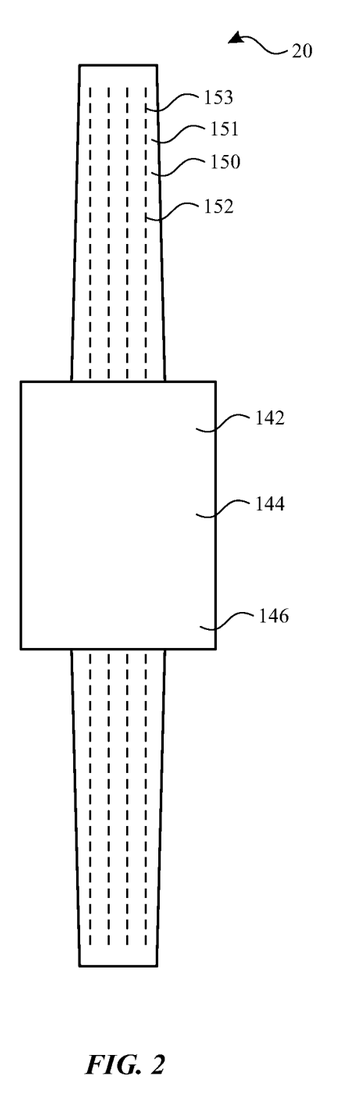
FIG. 2 illustrates a top view of a watch, according to some embodiments of the present disclosure.

With reference to FIG. 2, a watch band 150 for use with a watch 20 can provide a marker 152 to the electronic system 10. The watch 20 includes a watch body 142 that is worn on a wrist with a watch band 150. In some embodiments, the watch body 142 includes a display 144 and a housing 146 for containing components. The watch body 142 can be portable and also attached to other body parts of the user or to other devices, structures, or objects. The watch band 150 can be flexible and encircle or conform at least a portion of the wrist of a user. By securing the watch body 142 to the person of the user, the watch band 150 provides security and convenience.

The watch band 150 can have a band body 151 that is continuous structure or assembled as separate portions (e.g., straps) that join together and provide adjustable size configurations. The watch band 150 can include lugs at opposing ends of the band that fit within respective recesses or channels of the housing 146 and allow the watch band 150 to be removably attached to the housing 146. As can be appreciated, other attachment elements, such as locks, snaps, clasps, threads, and pins can be included on the watch band 150 for securely attaching to the watch body 142.

In some embodiments, the watch band 150 can be formed, at least partially by woven, fabric threads. The woven threads can include threads extending in a lengthwise or longitudinal direction, referred to as warp threads (or threads in a warp direction), and transverse threads drawn through and inserted over-and-under the warp threads, referred to as weft threads (or threads in a weft direction). Optionally, the woven threads can be arranged in one or more of a variety of weave patterns. Multiple layers, including opposing layers, can be interwoven together. In some embodiments, the watch band 150 can be formed, at least partially by knit, fabric threads. The knit fabric threads can include threads that are warp knit or flat knit.

As described herein, the watch band 150 can include features that allow the watch band 150 to function as a marker 152 or otherwise provide a marker pattern to provide a reference point in the physical environment for a virtual reality (VR) system, an augmented reality (AR) system, and/or a mixed reality (MR) system.

In the depicted example, the watch band 150 can include marker threads 153 that are identifiable by an electronic system to provide a marker pattern. The marker threads 153 can be woven into the threads of the band body 151. The marker threads 153 can be woven in a warp and/or weft direction similar to the woven threads of the watch band 150. In some embodiments, the marker threads 153 can be arranged in a pattern to provide identifiable information to the electronic system. In some embodiments, the marker threads 153 can be knit into the threads of the band body 151. The marker threads 153 can be warp knit or flat knit into the threads of the watch band 150.

Optionally, the marker threads 153 are indistinguishable from, imperceptible from, or otherwise hidden among the woven, fabric threads of the band body 151 under visible light in the human visible spectrum. In some embodiments, the marker threads 153 are formed from infrared reflective thread that reflects infrared light to provide a marker 152 or marker pattern, while being visually similar to the fabric of the band body 151 under visible light in the human visible spectrum.

Figure 3:
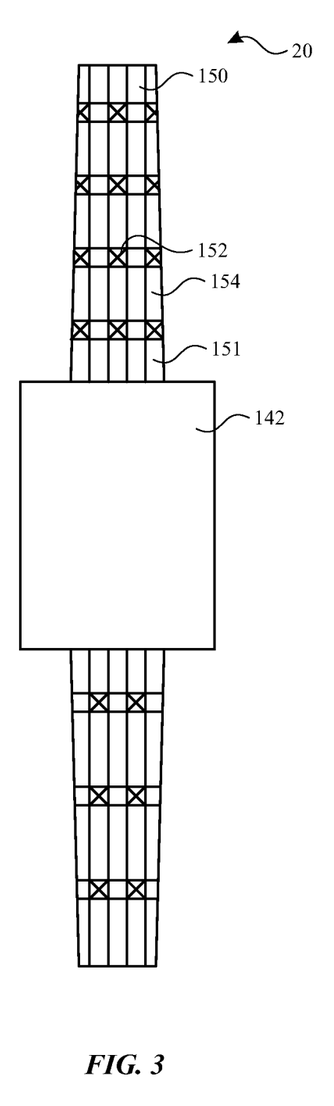
FIG. 3 illustrates a top view of a watch, according to some embodiments of the present disclosure.

With reference to FIG. 3, in some embodiments, the pattern of the marker 152 on the watch band 150 can be visually obscured by an overlay pattern 154, allowing for the watch band 150 to function as a marker 152 while permitting the watch band 150 to have a visually appealing design.

In the depicted example, a machine-identifiable pattern or marker 152 is displayed on the band body 151. The marker 152 can be printed, dyed, embossed, engraved, or attached to the surface of the band body 151. The arrangement or pattern of the marker 152 can be selected to be visually appealing. In some embodiments, the marker 152 is visible under visible light in the human visible spectrum. Optionally, the marker 152 may only be visible under ultraviolet and/or infrared light, or otherwise visible to an electronic system.

The watch band 150 can include an overlay pattern 154 in the human visible spectrum to obscure or integrate the marker 152 pattern into an aesthetically pleasing design. The overlay pattern 154 may incorporate the marker 152 to provide a recognizable or pleasing design. The overlay pattern 154 may overlap portions of the marker 152 while permitting the marker 152 to remain machine readable. In some embodiments, the overlay pattern 154 may divert visual attention from the markers 152.

Figure 4:
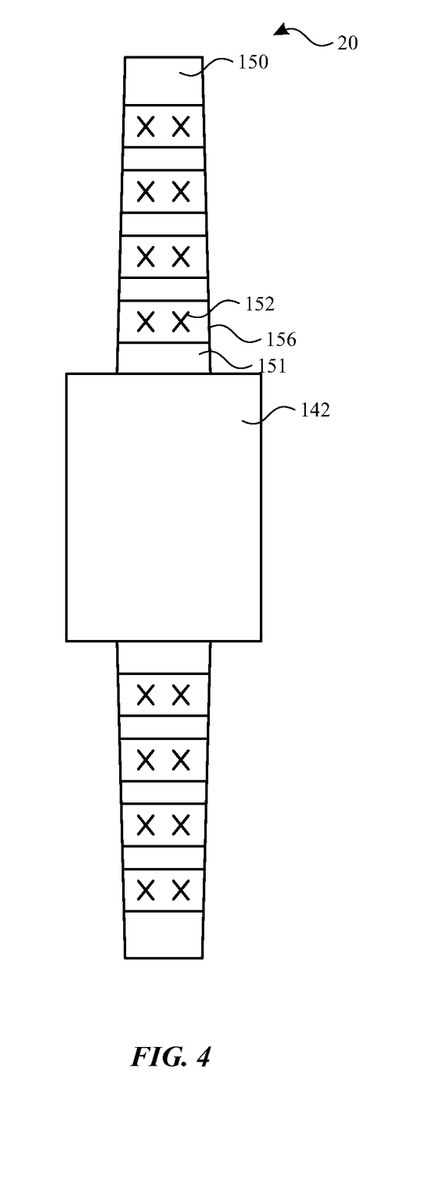
FIG. 4 illustrates a top view of a watch, according to some embodiments of the present disclosure.
Figure 5:
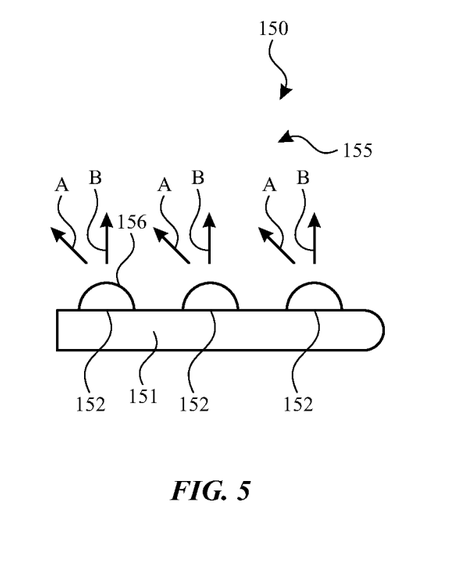
FIG. 5 illustrates a side view of the watch band of FIG. 4.

With reference to FIGS. 4 and 5, the watch band 150 can include a lenticular lens assembly 155 that allows the marker 152 to be visible from certain angles while obscuring the marker 152 from other angles.

In the depicted example, a machine-identifiable pattern or marker 152 is displayed on the band body 151. The marker 152 can be printed, dyed, embossed, engraved, or attached to the surface of the band body 151. In some embodiments, the marker 152 is visible under visible light. Optionally, the marker 152 may only be visible under ultraviolet and/or infrared light, or otherwise only visible to an electronic system.

As illustrated, one or more lenses 156 of the lenticular lens assembly 155 can be disposed over the patterns of the marker 152. The lenses 156 can refract light from the marker 152 such that the marker 152 is only visible from certain angles. For example, the marker 152 may only be visible through the lens 156 at an angle A and obscured when viewed at an angle B. In some embodiments, the characteristics of the lenses 156 can be selected such that the angle A permits the electronic device to view the marker 152 while angle B obscures the marker 152 from the user's view.

Figure 6:
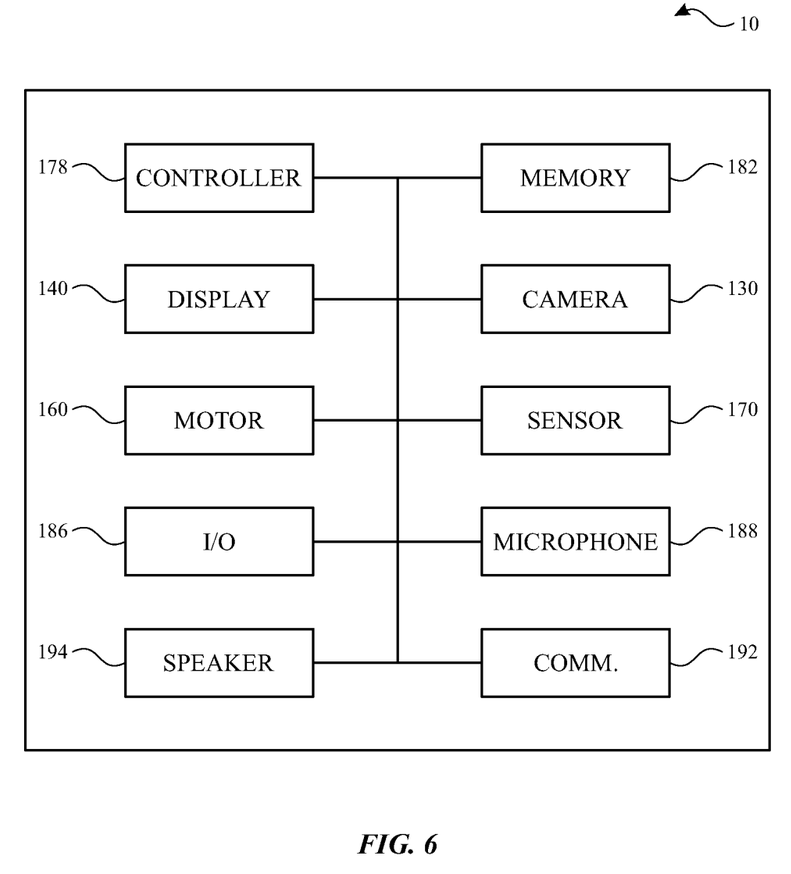
FIG. 6 illustrates a block diagram of a computer-generated reality device, in accordance with some embodiments of the present disclosure.

Referring now to FIG. 6, components of the electronic device can be operably connected to provide the performance described herein. FIG. 6 shows a simplified block diagram of an illustrative electronic system 10 that provides a virtual reality (VR) system, an augmented reality (AR) system, and/or a mixed reality (MR) system in accordance with one embodiment of the invention. It will be understood that additional components, different components, or fewer components than those illustrated may be utilized within the scope of the subject disclosure.

As shown in FIG. 6, the electronic system 10 can include a controller 178 (e.g., control circuitry) with one or more processing units that include or are configured to access a memory 182 having instructions stored thereon. The instructions or computer programs may be configured to perform one or more of the operations or functions described with respect to the electronic system 10. The controller 178 can be implemented as any electronic device capable of processing, receiving, or transmitting data or instructions. For example, the controller 178 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 182 can store electronic data that can be used by the electronic system 10. For example, the memory 182 can store electrical data or content such as, for example, audio and video files, documents and applications, device settings and user preferences, timing and control signals or data for the various modules, data structures or databases, and so on. The memory 182 can be configured as any type of memory. By way of example only, the memory 182 can be implemented as random access memory, read-only memory, Flash memory, removable memory, or other types of storage elements, or combinations of such devices.

The electronic system 10 can further include a display element 140 for displaying visual information for a user. The display element 140 can provide visual (e.g., image or video) output. The display element 140 can be or include an opaque, transparent, and/or translucent display. The display element 140 may have a transparent or translucent medium through which light representative of images is directed to a user's eyes. The display element 140 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The electronic system 10 can include an optical subassembly configured to help optically adjust and correctly project the image-based content being displayed by the display element 140 for close up viewing. The optical subassembly can include one or more lenses, mirrors, or other optical devices.

The electronic system 10 can include adjustment control components described herein, such as a motor 160, an actuator, and the like for moving components to a desired relative position and/or orientation.

The electronic system 10 can include one or more sensors 170, as described herein. The electronic system 10 can include one or more other sensors. Such sensors can be configured to sense substantially any type of characteristic such as, but not limited to, images, pressure, light, touch, force, temperature, position, motion, and so on. For example, the sensor can be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. By further example, the sensor can be a bio-sensor for tracking biometric characteristics, such as health and activity metrics. Sensors can include a camera which can capture image based content of the outside world.

The electronic system 10 can include an input/output component 186, which can include any suitable component for connecting electronic system 10 to other devices. Suitable components can include, for example, audio/video jacks, data connectors, or any additional or alternative input/output components. The input/output component 186 can include buttons, keys, or another feature that can act as a keyboard for operation by the user.

The electronic system 10 can include the microphone 188 as described herein. The microphone 188 can be operably connected to the controller 178 for detection of sound levels and communication of detections for further processing, as described further herein.

The electronic system 10 can include the speakers 190 as described herein. The speakers 194 can be operably connected to the controller 178 for control of speaker output, including sound levels, as described further herein.

The electronic system 10 can include communications circuitry 192 for communicating with one or more servers or other devices using any suitable communications protocol. For example, communications circuitry 192 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, Bit-Torrent, FTP, RTP, RTSP, SSH, any other communications protocol, or any combination thereof. Communications circuitry 192 can also include an antenna for transmitting and receiving electromagnetic signals.

The electronic system 10 can include a battery, which can charge and/or power components of the electronic system 10. The battery can also charge and/or power components connected to the electronic system 10.

Accordingly, embodiments of the present disclosure provide a watch band that provide a marker pattern to a computer-generated reality device. The watch band can include structures or features that provide an identifiable marker pattern to the computer-generated reality device. The structures or features that provide the marker pattern can be invisible or imperceptible to the user. Structures or features of the watch band can include infrared reflective thread, visually obscured markers, or lenticular lens assemblies.

Various examples of aspects of the disclosure are described below as clauses for convenience. These are provided as examples, and do not limit the subject technology.

Clause A: watch band comprising: band body configured to couple to a watch and to conform around a portion of a user's body; and an infrared reflective thread woven into the band body, wherein the infrared reflective thread is configured to reflect a machine-identifiable infrared marker pattern to indicate a position of the watch band.

Clause B: watch band, the watch band comprising: a band body defining an inner surface and an outer surface, the band body configured to couple to a watch and to conform around a portion of a user's body; a visible pattern disposed on the outer surface of the band body, wherein the visible pattern is configured to provide a machine-identifiable marker pattern to indicate a position of the watch band; and a visible overlay pattern disposed on the outer surface of the band body, wherein the visible overlay pattern at least partially overlaps the visible pattern.

Clause C: watch band, the watch band comprising: a band body defining an inner surface and an outer surface, the band body configured to couple to a watch and to conform around a portion of a user's body; and a lenticular lens assembly disposed on the outer surface of the band body, the lenticular lens assembly comprising: a pattern disposed on the outer surface of the band body; and an array of lenses configured to display the pattern at a first viewing angle and to obscure the pattern at a second viewing angle.

One or more of the above clauses can include one or more of the features described below. It is noted that any of the following clauses may be combined in any combination with each other, and placed into a respective independent clause, e.g., clause A, B, or C.

Clause 1: the infrared reflective thread is woven in a warp direction.

Clause 2: the infrared reflective thread is woven in a weft direction.

Clause 3: the infrared reflective thread is hidden within the band body under visible light in the human visible spectrum.

Clause 4: the infrared reflective thread is configured to reflect the machine-identifiable infrared marker pattern to a computer-generated reality device to indicate the position of the watch band relative to the computer-generated reality device.

Clause 5: the machine-identifiable infrared marker pattern permits the computer-generated reality device to display an interface corresponding to the position of the watch band.

Clause 6: the machine-identifiable infrared marker pattern permits calibration of the computer-generated reality device.

Clause 7: the infrared reflective thread is configured to reflect the machine-identifiable infrared marker pattern to a head-mountable device to indicate the position of the watch band relative to the head-mountable device.

Clause 8: the visible overlay pattern visually obscures the visible pattern.

Clause 9: the visible pattern is visible under visible light in the human visible spectrum.

Clause 10: the visible pattern is printed, dyed, embossed, engraved, or coupled to the outer surface of the band body.

Clause 11: at least one lens of the array of lenses is disposed over the pattern.

Clause 12: the pattern is visible under visible under ultraviolet or infrared light.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A watch band comprising:
   a band body configured to couple to a watch and to conform around a portion of a user's body;
   an infrared reflective thread woven into the band body, wherein the infrared reflective thread is configured to reflect a machine-identifiable infrared marker pattern to indicate a position of the watch band; and
   a visible overlay pattern disposed on an outer surface of the band body, wherein the visible overlay pattern at least partially overlaps the infrared reflective thread.

2. The watch band of claim 1, wherein the infrared reflective thread is woven in a warp direction.

3. The watch band of claim 1, wherein the infrared reflective thread is woven in a weft direction.

4. The watch band of claim 1, wherein the infrared reflective thread is hidden within the band body under visible light in the human visible spectrum.

5. The watch band of claim 1, wherein the infrared reflective thread is configured to reflect the machine-identifiable infrared marker pattern to a computer-generated reality device to indicate the position of the watch band relative to the computer-generated reality device.

6. The watch band of claim 5, wherein the machine-identifiable infrared marker pattern permits the computer-generated reality device to display an interface corresponding to the position of the watch band.

7. The watch band of claim 5, wherein the machine-identifiable infrared marker pattern permits calibration of the computer-generated reality device.

8. The watch band of claim 1, wherein the infrared reflective thread is configured to reflect the machine-identifiable infrared marker pattern to a head-mountable device to indicate the position of the watch band relative to the head-mountable device.

9. A watch band, the watch band comprising:
   a band body defining an inner surface and an outer surface, the band body configured to couple to a watch and to conform around a portion of a user's body;
   a visible pattern disposed on the outer surface of the band body, wherein the visible pattern is configured to provide a machine-identifiable marker pattern to indicate a position of the watch band; and
   a visible overlay pattern disposed on the outer surface of the band body, wherein the visible overlay pattern at least partially overlaps the visible pattern.

10. The watch band of claim 9, wherein the visible overlay pattern visually obscures the visible pattern.

11. The watch band of claim 9, wherein the visible pattern is visible under visible light in the human visible spectrum.

12. The watch band of claim 9, wherein the visible pattern is printed, dyed, embossed, engraved, or coupled to the outer surface of the band body.

13. The watch band of claim 9, wherein the machine-identifiable marker pattern permits a computer-generated reality device to display an interface corresponding to the position of the watch band.

14. A watch band, the watch band comprising:
   a band body defining an inner surface and an outer surface, the band body configured to couple to a watch and to conform around a portion of a user's body; and
   a lenticular lens assembly disposed on the outer surface of the band body, the lenticular lens assembly comprising:
      a pattern disposed on the outer surface of the band body; and
      an array of lenses configured to display the pattern at a first viewing angle and to obscure the pattern at a second viewing angle.

15. The watch band of claim 14, wherein at least one lens of the array of lenses is disposed over the pattern.

16. The watch band of claim 14, wherein the pattern is printed, dyed, embossed, engraved, or coupled to the outer surface of the band body.

17. The watch band of claim 14, wherein the pattern is visible under visible light in the human visible spectrum.

18. The watch band of claim 14, wherein the pattern is visible under visible under ultraviolet or infrared light.

19. The watch band of claim 14, wherein the pattern permits a computer-generated reality device to display an interface corresponding to a position of the watch band.

20. The watch band of claim 14, wherein the pattern permits calibration of a computer-generated reality device.

\* \* \* \* \*

UNITED STATES PATENT AND TRADEMARK OFFICE
CERTIFICATE OF CORRECTION

PATENT NO. : 11,998,090 B1
APPLICATION NO. : 17/554350
DATED : June 4, 2024
INVENTOR(S) : Kathryn P. Crews et al.

It is certified that error appears in the above-identified patent and that said Letters Patent is hereby corrected as shown below:

On the Title Page

Item [72], Please replace: "Shantanu R Ranade" with: --Shantanu R. Ranade--.

Signed and Sealed this
Twentieth Day of August, 2024

Katherine Kelly Vidal
*Director of the United States Patent and Trademark Office*